United States Patent Office 2,780,320
Patented Feb. 5, 1957

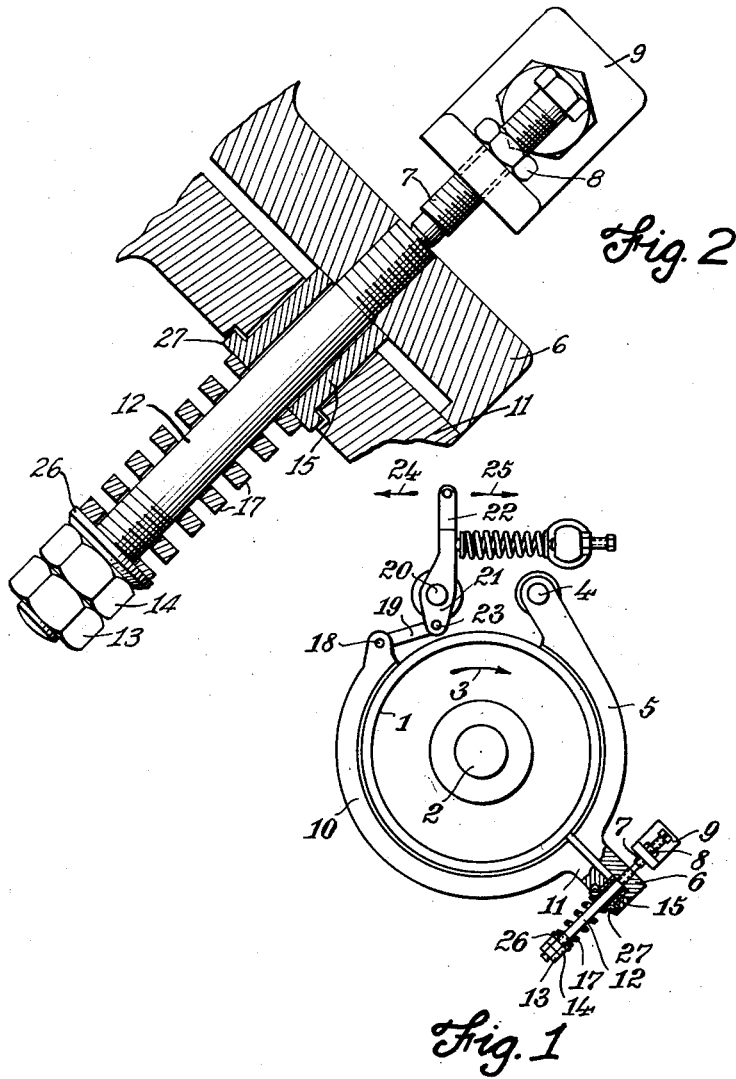

2,780,320
MECHANICAL BRAKE WITH DIVIDED BRAKE BAND

Herman Walter, Goppingen, Wurttemberg, Germany, assignor to L. Schuler A.-G., Goppingen, Wurttemberg, Germany Application June 27, 1951, Serial No. 233,725

Claims priority, application Germany June 29, 1950

4 Claims. (Cl. 188—77)

This invention relates to a band brake with a divided band division portion or having a two-part band.

Band brakes are known having a number of divisions or spaces as a divided band. It is also known to mount the brake band part at the fixed point by spring means. However, in the known structures with spring bearings for the stationary point, chattering and jerking have been observed and other drawbacks of the brake band upon application thereof are present. These various drawbacks are avoided when, according to applicant's invention the brake sections or parts at the point of interconnection are spring or elastically secured to each other in a tangential direction. The spring force is necessarily adjustable and the brake upon operation of the spring force will more or less permit a soft spring reaction for a smooth operation of the brake.

The invenion consists in the brake bands or shoes being interconnected with one another at the point of division by a bolt which is mounted in a tangential manner, and which passes through a perforation or hole in an end lug of one band shoe. The bolt is secured in an end lug of the other band shoe whereby a compression spring is mounted to operate between an abutment formed on a bolt fastened tangentially to the drum on the one end and another end lug through which the bolt passes. The spring is adjustable by means of a pair of nuts to change the tension in the spring.

A further object and advantage of the invention resides in an adjustable end structure for one of the brake band sections, that is, an adjustable screw to permit an adjustment of the brake sections so that when the brake is not applied the brake shoes will be uniformly spaced from a brake drum. A further feature of the invention consists in the insertion of a loose sleeve, with a collar or flange at one end, between the bolt and the brake band end attachment through which the bolt is passed, said sleeve being of such length that when the brake is released, the compression spring bears on the sleeve collar instead of on the said end attachment.

Further objects will be apparent from the following description when considered in connection with the accompanying drawing.

The drawing shows in Fig. 1 a side elevation partly in section of one form of the brake according to the invention, and in Fig. 2 a sectional view of a detail on an enlarged scale.

In the structure shown the brake band is arranged around a brake disc or drum 1 which is mounted on a shaft 2 and rotates in the direction of the arrow 3 or clockwise. A brake band section or part 5 is swingably mounted on a fixed bearing pin 4 at one end and at the other end terminating in a projecting member 6 for connection to a second brake band section. Upon releasing the brake projecting lug 6 contacts an adjustable stop which is in the form of a screw 7 located on the side of lug 6 remote from the second brake band section, said screw being adjustable in a securing or angle bracket 9 and being held in adjusted position by a counter nut 8.

The second brake band half or section 10 is provided with a projecting lug 11 corresponding to the lug 6. A bolt or rod 12 is secured in the lug 6 and projects through a bore in the lug 11. A nut 13 on the end of bolt 12 cooperates with a counter nut 14. A disc 26 is mounted on the bolt 12 adjacent the nut 14. Against the disk one end of a compression spring 17 abuts. The other end of the spring 17 abuts against a surface ring 27 of a bushing 15, which is provided in the hole or boring in the brake band lug 11. The bushing abuts against the lug 6 of the brake band part 5.

Between the washer surface 27 of the bushing 15 and the disk 26 of the bolt 12 part, the spring 17 thus applies an adjustable force without however any of the spring force reacting on the lug 11 of the brake section 10 as long as the brake is not applied.

At the end of the brake shoe part 10 opposed to lug 11, a pulling link 19 is secured at a pin or bolt connection 18 to swing thereabout. The link 19 is also connected to 23 to a two-armed actuating member 21, 22 which is pivotally mounted on a bearing pin or bolt 20 to swing therearound. If the arm 22 is forced counterclockwise (in the direction of the arrow 24), then the brake bands or shoes 5 and 10 will be applied on the drum 1. In this position the lug 11 will be forced against the ring 27 of the bushing 15 and thus further compress spring 17. If the arm 22 is, however, moved clockwise, that is, in the direction of the arrow 25, then the brake will be released. The brake band parts are therefore lifted off. Thus the compression force of the spring 17 will be partly eased until the washer part 27 of the bushing 15 contacts the lug 6 which limits the expansion of the spring 17. In this position the lug 11 of the brake shoe 10 will be free to move out of contact with the part 27 of the bushing 15. Thus the brake shoes in the fully released position of the brake will not be under the influence of spring tension or compression. The purpose and operation of the adjustable screw is as follows. Upon releasing the brake by the swinging movement of the lever arm 22 in the direction of the arrow 25, the lug 6 will abut against the screw 7, whereby the brake band section 5 will be spaced from the brake disk 1. Upon the further swinging movement of the lever arm 22, the brake band section 10 will also be spaced from the brake drum 1. The screw 7 is so adjusted that upon the release of the brake, the spacing between the brake band sections and the brake disk is approximately divided in half as between the brake band 5 and the brake band 10. If the screw were omitted or if it were set at too great a distance from the section 6, the situation would occur in which the brake band 10 upon release would not be out of contact with the brake disk 1.

The band brake according to this invention is operated in the well known and usual manner. It is operable by mechanical means by operation of the lever arm 22 by suitable elements.

The band brake according to the invention is applicable in any installation or machine where a braking power is desired. The band brake according to the invention can be advantageously used, inter alia, in presses of all types, for example in eccentric presses in which it is required to destroy rapidly large amounts of energy stored in rotating parts.

The invention is capable of application in any machine, both stationary or movable and the invention is not limited to the precise embodiment illustrated, since the invention is capable of many modifications within the scope of the appended claims.

I claim:
1. A brake comprising a brake drum, a brake band subdivided into at least two sections and extending around the brake drum with one end of the band fixed to a stationary point and the other end of the band fixed to a brake actuator, the ends of the band sections facing each other at the dividing point of the brake band and each provided with a radial lug, a bolt fixed to the lug of one band section and extending through a hole in the adjacent lug of the other band section and projecting beyond said last-mentioned lug, the end of the bolt projecting beyond the last-mentioned lug having an abutment, and a spring arranged around the bolt between the last-mentioned abutment and the last-mentioned lug.

2. A brake according to claim 1, in which the bolt is arranged tangentially relative to the brake drum.

3. A brake according to claim 1, in which a loose bushing with an end flange is provided inserted between the bolt and the brake band lug through which the bolt passes, said spring contacting at one end on the flange.

4. A brake according to claim 1, in which an adjustable stop is provided to limit the release of the brake band section secured to the stationary point.

References Cited in the file of this patent

UNITED STATES PATENTS

| | | |
|---|---|---|
| 966,312 | Crenshaw | Aug. 2, 1910 |
| 977,714 | Denton | Dec. 6, 1910 |
| 1,470,007 | Jenckes | Oct. 9, 1923 |
| 1,625,103 | Smith | Apr. 19, 1927 |
| 1,752,377 | Glueck | Apr. 1, 1930 |
| 1,840,337 | Traupmann | Jan. 12, 1932 |
| 1,952,324 | Lljungstrom | Mar. 27, 1934 |
| 2,147,939 | Tishken | Feb. 21, 1939 |

FOREIGN PATENTS

| | | |
|---|---|---|
| 685,878 | France | Apr. 7, 1930 |